United States Patent
Naitou et al.

(10) Patent No.: US 9,776,328 B2
(45) Date of Patent: Oct. 3, 2017

(54) ROBOT CONTROL APPARATUS HAVING FUNCTION OF DETECTING CONTACT WITH OBJECT OR PERSON

(71) Applicant: FANUC CORPORATION, Yamanashi (JP)

(72) Inventors: Yasuhiro Naitou, Yamanashi (JP); Soichi Arita, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 13 days.

(21) Appl. No.: 15/063,511

(22) Filed: Mar. 8, 2016

(65) Prior Publication Data

US 2016/0279796 A1  Sep. 29, 2016

(30) Foreign Application Priority Data

Mar. 23, 2015  (JP) ................. 2015-059721

(51) Int. Cl.
*B25J 9/16* (2006.01)
*B25J 13/08* (2006.01)
*B25J 19/06* (2006.01)

(52) U.S. Cl.
CPC .......... *B25J 9/1676* (2013.01); *B25J 13/085* (2013.01); *B25J 19/06* (2013.01); *G05B 2219/40201* (2013.01); *G05B 2219/40202* (2013.01)

(58) Field of Classification Search
CPC ........ B25J 9/1676; B25J 13/085; B25J 19/06; G05B 2219/40201; G05B 2219/40202
See application file for complete search history.

(56) References Cited

U.S. PATENT DOCUMENTS

| | | | |
|---|---|---|---|
| 2007/0142967 A1 | 6/2007 | Volcic et al. | |
| 2015/0081099 A1* | 3/2015 | Komatsu | B25J 13/085 700/258 |

FOREIGN PATENT DOCUMENTS

| | | |
|---|---|---|
| CN | 103099586 A | 5/2013 |
| CN | 103792942 A | 5/2014 |
| JP | 6-245561 A | 9/1994 |
| JP | 2003-25272 A | 1/2003 |
| JP | 3367641 B2 | 1/2003 |
| JP | 3459973 B2 | 10/2003 |
| JP | 2006-263916 A | 10/2006 |
| JP | 2014-18901 A | 2/2014 |

* cited by examiner

*Primary Examiner* — Khoi Tran
*Assistant Examiner* — Robert Nguyen
(74) *Attorney, Agent, or Firm* — Hauptman Ham, LLP

(57) ABSTRACT

A robot control apparatus comprises a contact detection unit which judges whether or not a robot is in contact with an object other than the robot, and an operation direction monitor unit which detects an operation direction of the robot after the robot comes in contact with the object and monitors operation of the robot. After the robot comes in contact with the object, the operation direction monitor unit permits operation of the robot being within a permissible range and inhibits operation of the robot falling outside the permissible range.

3 Claims, 4 Drawing Sheets

ROBOT CONTROL APPARATUS HAVING FUNCTION OF DETECTING CONTACT WITH OBJECT OR PERSON

RELATED APPLICATIONS

The present application claims priority to Japanese Application Number 2015-059721, filed Mar. 23, 2015, the disclosure of which is hereby incorporated by reference herein in its entirety.

BACKGROUND OF THE INVENTION

1. Field of the Invention

The present invention relates to a robot control apparatus which controls a robot.

2. Description of the Related Art

In recent years, a robot system is known in which a person performs work in collaboration with a robot. In this robot system, the robot and the person perform work in a state where no safety fence is provided around the robot. A switch known as a deadman switch is disposed in a robot control apparatus. For example, when a worker presses the deadman switch at a time when the robot is to be stopped, the robot can be urgently stopped. Including the deadman switch can improve safety.

In addition, during operation of a robot, the robot sometimes comes in contact with a surrounding object or person. For example, when a person is working in collaboration with a robot, the robot may come in contact with surrounding equipment or may come in contact with a worker. In such a case, a robot system is known to control so as to detect an external force and stop the robot or perform a retreat operation for avoiding the contacted object (for example, see Japanese Patent No. 3367641, Japanese Patent No. 3459973, or Japanese Laid-open Patent Publication No. 2014-18901).

A robot is controlled so as to move along a previously produced trajectory. The trajectory of the robot can be produced based on teaching points and a speed designated by a worker. The teaching points can be set by operation of a teaching operation panel by the worker. For example, by operating the teaching operation panel, the robot is placed in a desired position and posture. The position of a tool tip point of the robot at that time can be stored as a teaching point. Then, the robot control apparatus can produce a trajectory so that the robot passes through or near the teaching point.

In a period during which teaching points are taught to the robot, the robot may frequently contact with surrounding equipment. For example, when teaching an operation of placing a workpiece on a work table, the hand of the robot is opened in a state where the workpiece is brought close to the work table. In this case, when a position for opening the hand is too high, the workpiece can be damaged. Accordingly, the position for opening the hand is preferably a position at which the workpiece is close to the work table.

The worker moves the robot up and down for adjustments in order to teach a position at which the workpiece is located slightly above the work table. When the worker is performing the operation of bringing the workpiece close to the work table, the workpiece may contact with the work table.

When the robot comes in contact with an outside object, it is preferable to cause the robot to retreat by an appropriate method. In a method of stopping a robot when the robot comes in contact with an outside object, the contact state continues and therefore the robot cannot be operated, which causes a problem in that teaching cannot be continued.

On the other hand, when the robot automatically performs a retreat operation, there is a problem in that efficiency of teaching work is deteriorated. For example, when the workpiece descends and comes in contact with the work table, control for causing the robot to automatically ascend is considered. Then, an operation of causing the robot to automatically ascend is set so as to be greatly moved in consideration of safety. Due to this, the worker needs to cause the robot to descend again to move the workpiece close to the work table. However, when the operation is not performed as desired, the workpiece may contact with the work table again. In other words, a state where the workpiece is in contact with the work table and a state where the workpiece is away therefrom may be repeated alternately. Since the worker needs to repeat the same operation, there is a problem in that teaching time becomes long.

SUMMARY OF THE INVENTION

A robot control apparatus of the present invention comprises a contact detection unit which judges whether or not a robot is in contact with an object other than the robot and an operation direction monitor unit which detects an operation direction of the robot after the robot comes in contact with the object, and monitors operation of the robot. A permissible range for the operation direction of the robot after the robot comes in contact with the object is previously determined. After the robot comes in contact with the object, the operation direction monitor unit permits operation of the robot being within the permissible range and inhibits operation of the robot falling outside the permissible range.

In the above invention, the robot control apparatus may comprises a selector switch which can switch between a teaching mode in which a worker manually operates the robot so as to teach an operation of the robot and a playback mode in which the robot automatically reproduces the taught operation and a retreat command unit which automatically operates the robot in a direction away from the object when the robot comes in contact with the object, in which when the playback mode is selected by the selector switch, the robot may be operated by the retreat command unit when the robot comes in contact with the object, and when the teaching mode is selected by the selector switch, the operation of the robot may be monitored by the operation direction monitor unit when the robot comes in contact with the object.

In the above invention, the operation direction monitor unit may stop the robot when the operation direction of the robot falls outside the permissible range.

DETAILED DESCRIPTION

Figure 1:
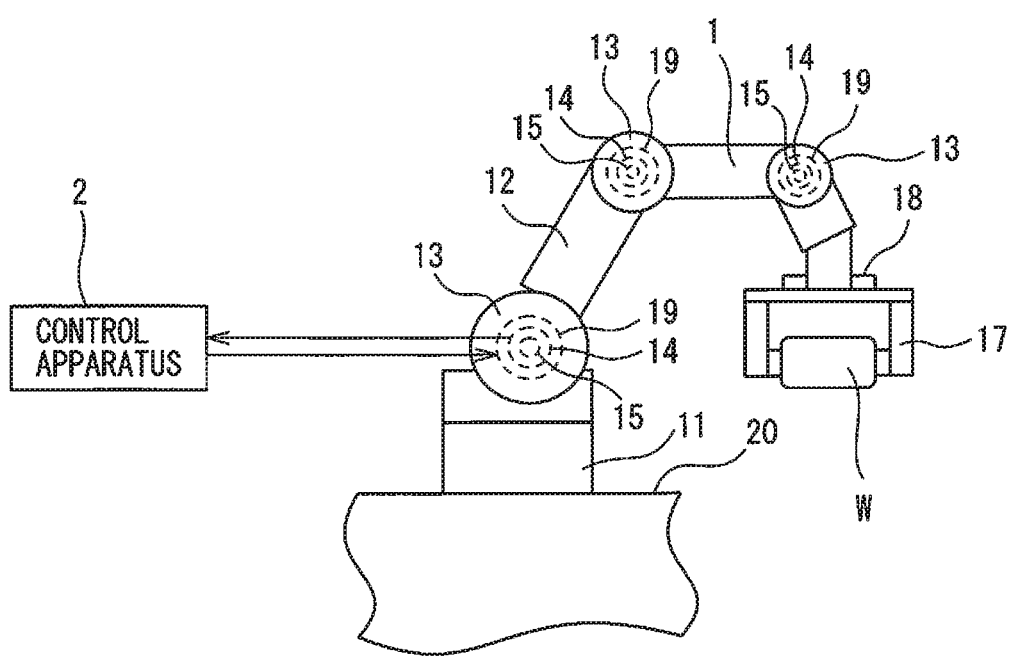
FIG. 1 is a schematic diagram of a robot system in an embodiment.

A description will be given of robot control apparatuses in embodiments with reference to FIGS. 1 to 5. FIG. 1 is a schematic diagram of a robot system in a present embodiment. The robot system includes a robot 1 which performs conveyance of a workpiece W and a control apparatus 2 as a robot control apparatus which controls the robot 1.

The robot 1 of the present embodiment is a multi-joint robot including an arm 12 and a plurality of joint units 13. A hand 17 has a function of holding and releasing the workpiece W. The robot 1 includes a base unit 11 supporting the arm 12. The base unit 11 is fixed to an installation surface 20.

The robot 1 includes an arm drive device which drives each of the joint units 13. The arm drive device includes an arm drive motor 14 arranged in the joint units 13. Driving the arm drive motor 14 allows the arm 12 to be bent at a desired angle at the joint units 13. In addition, the robot 1 of the present embodiment is formed so that an entire part of the arm 12 can be rotated around a rotation axis extending in a vertical direction. The arm drive device includes a drive motor which is arranged at the base unit 11 and rotates the entire part of the arm 12.

The robot 1 includes a hand drive device which closes and opens the hand 17. The hand drive device in the present embodiment drives the hand 17 by air pressure. The hand drive device includes a hand drive cylinder 18 connected to the hand 17, an air pump for supplying compressed air to the hand drive cylinder 18, and an electromagnetic valve.

The robot 1 is driven based on an operation command of the control apparatus 2. The arm drive device and the hand drive device are controlled by the control apparatus 2. For example, the rotation angle of the arm drive motor 14 and the air pressure of the hand drive cylinder 18 are controlled by the control apparatus 2.

Figure 2:
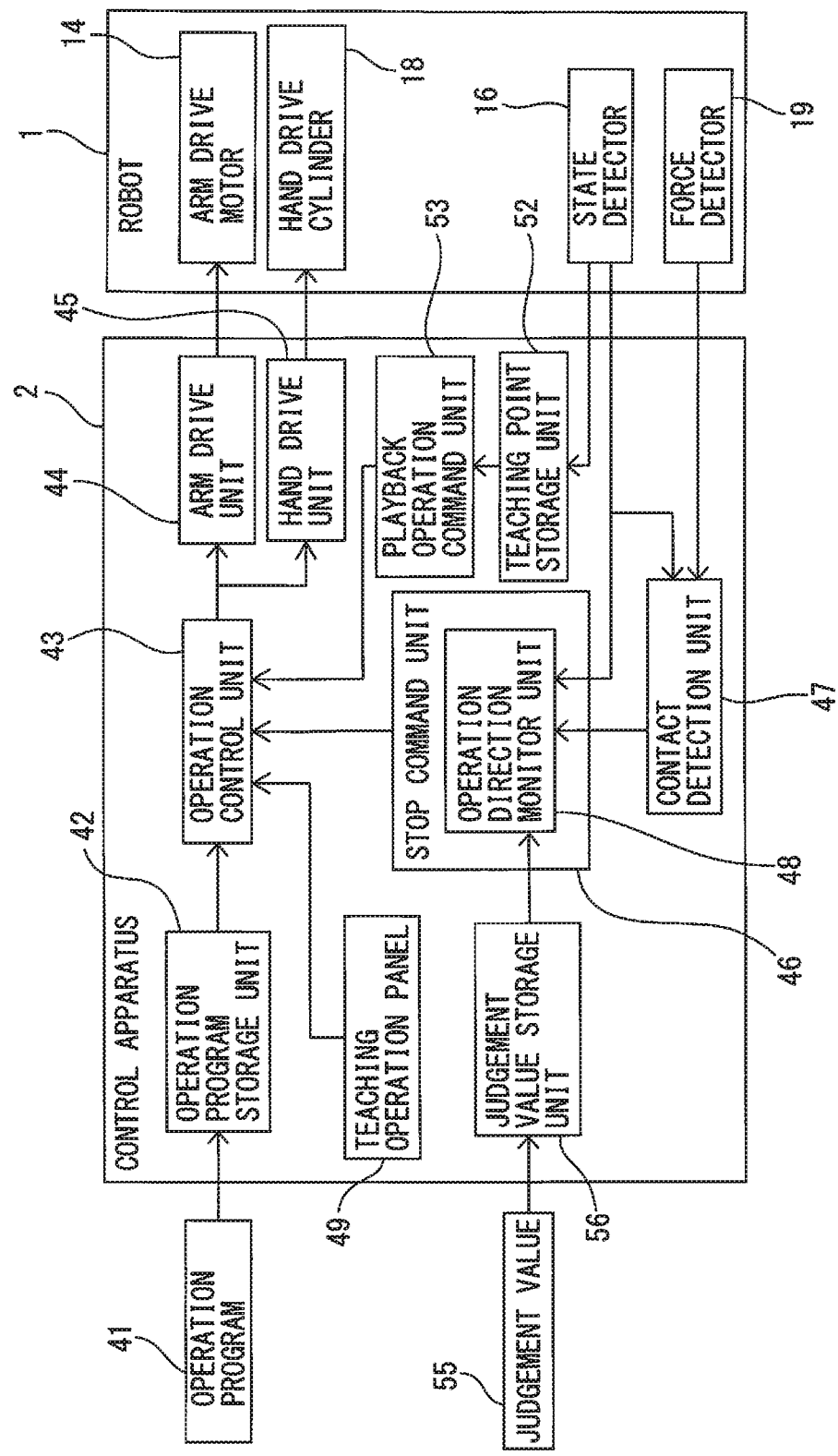
FIG. 2 is a block diagram of a first robot system in the embodiment.

FIG. 2 shows a block diagram of a first robot system in the present embodiment. Referring to FIGS. 1 and 2, the robot 1 in the present embodiment can convey a workpiece based on an operation program 41. The robot 1 can automatically convey a workpiece W from an initial position to a target position. The control apparatus 2 includes an arithmetic processing device having a CPU (central processing unit), a RAM (random access memory), a ROM (read only memory), and the like connected to each other via a bus.

The operation program 41 previously determined to perform operation of the robot 1 is input to the control apparatus 2. The operation program 41 is stored in an operation program storage unit 42. An operation control unit 43 sends an operation command for driving the robot 1 based on the operation program 41. The operation control unit 43 sends an operation command for driving the arm drive device to an arm drive unit 44. The arm drive unit 44 includes an electric circuit which drives the arm drive motor 14 and the like, and based on the operation command, supplies electric power to the arm drive motor 14 and the like. Driving the arm drive motor 14 allows adjustments in the bending angle of the arm 12, the direction thereof, and the like.

In addition, the operation control unit 43 sends an operation command for driving the hand drive device to a hand drive unit 45. The hand drive unit 45 includes an electric circuit for driving the air pump and the like, and based on the operation command, compressed air is supplied to the hand drive cylinder 18. The hand 17 is open or closed by adjusting pressure of the air supplied to the hand drive cylinder 18.

The robot 1 includes a force detector 19 which detects a force applied to the joint units 13. In the present embodiment, the force detector 19 is arranged at each joint unit 13. The force detector 19 is formed so as to be able to detect a magnitude of a force applied to the joint unit 13 and a direction of the force. An example of the force detector 19 which can be employed is a six-axis force sensor which can detect forces in three orthogonal axial directions and moments about three orthogonal axes. In addition, the force detector may also be attached between a tip of the arm 12 and the hand 17.

The robot 1 in the present embodiment includes a state detector 16 which detects a position and a posture of the robot. The state detector 16 detects a position relating to a reference point of the arm 12, such as a tool tip point, bending states of the arm 12 at the joint units 13, a direction in which the arm 12 is oriented, and the like. An output of the state detector 16 is input to the control apparatus 2.

The state detector 16 in the present embodiment includes a rotation angle detector 15 attached to each arm drive motor 14. The rotation angle detector 15 detects a rotation angle at which the arm drive motor 14 is driven. Based on the rotation angle of the each arm drive motor 14, angles at the joint units 13 can be detected. In addition, the state detector 16 includes a rotation angle detector which detects a rotation angle of the arm 12 with respect to the base unit 11. Based on the detected rotation angle, a direction in which the arm 12 is extended can be detected.

The control apparatus 2 of the present embodiment includes a stop command unit 46 which sends a command for putting the robot 1 into a stopped state to the operation control unit 43. The stop command unit 46 is formed so as to be able to send a drive stop command in both states of a drive period and a stop period of the robot 1. Upon reception of the stop command, the operation control unit 43 stops execution of the operation program 41. Then, driving of the robot 1 is stopped. When the stop command is sent during the stop period of the robot 1, the operation control unit 43 maintains the stop state of the robot 1.

The control apparatus 2 includes a judgement value storage unit 56. A judgement value 55 for determining a permissible range for an angle at which retreat operation is performed is previously input to the judgement value storage unit 56, as will be described later. The judgement value storage unit 56 stores an angle judgement value. The stop command unit 46 reads the angle judgement value from the judgement value storage unit 56. Additionally, a single storage unit may be shared for the storage units such as the operation program storage unit 42 and the judgement value storage unit 56.

The control apparatus 2 includes a teaching operation panel 49. The teaching operation panel 49 is also referred to as teaching pendant. The teaching operation panel 49 is an operation panel for storing, after a worker moves the robot 1 to an arbitrary position, the position as a teaching point in the control apparatus 2. Switches and buttons necessary to operate the robot 1 are arranged on the teaching operation panel 49. The teaching operation panel 49 sends a signal corresponding to the operation of the worker to the operation control unit 43. The operation control unit 43 drives the arm drive motor 14 and the hand drive cylinder 18 based on the signal received from the teaching operation panel 49.

The control apparatus 2 comprises a teaching point storage unit 52 which stores teaching points designated by operation of the teaching operation panel 49. The teaching point storage unit 52 stores the teaching points based on the output of the state detector 16. The control apparatus 2 includes a playback operation command unit 53 which sends a command for performing a playback operation of the robot 1 based on the stored teaching points. The output of the playback operation command unit 53 is sent to the operation control unit 43.

The robot system of the present embodiment is formed so as to be able to drive the robot 1 based on the operation program 41. Additionally, the robot system of the present embodiment is formed so that a worker can manually operate the robot 1. First, a description will be given of control in which the worker manually operates the robot 1.

The control apparatus 2 comprises a contact detection unit 47 which judges whether or not the robot 1 is in contact with an object other than the robot 1 (hereinafter simply referred to as "other object"). The other object includes equipment and a person such as a worker around the robot 1. An output signal of the force detector 19 is input to the contact detection unit 47. During an operation period of the robot 1, the robot 1 sometimes receives a force from outside (hereinafter referred to as "external force"). The contact detection unit 47 is formed so as to be able to detect an external force applied to the robot 1. A force applied to the arm 12 can be detected by the force detector 19.

A parameter for driving the robot is input to the control apparatus 2. The parameter includes a mass parameter. The mass parameter includes information relating to a mass of each portion of the robot 1 and a mass of the workpiece W for estimating an internal force applied to the robot 1.

The contact detection unit 47 estimates an internal force generated by the mass of the robot 1 and operation of the robot 1. The internal force is a force applied to the robot 1 by an own weight thereof when the robot 1 is operated in a state where no force is applied from outside the robot 1. The internal force can be calculated based on a position and a posture of the robot 1 detected by the state detector 16 and the mass parameter.

The contact detection unit 47 can calculate an external force by subtracting the estimated internal force from the force detected by the force detector 19. The contact detection unit 47 compares the calculated external force with a contact judgement value. Then, when the calculated external force is larger than the contact judgement value, the contact detection unit 47 can judge that the other object is in contact with the robot 1.

Additionally, arbitrary control can be employed as the control for judging whether or not the other object is in contact with the robot. For example, based on a disturbance current of the motor of the arm drive device, a disturbance torque can be estimated. Then, when the disturbance torque exceeds a predetermined judgement value, it can be judged that the robot 1 is in contact with an other object. Alternatively, surfaces of the arm and the joint units can be covered with a covering member having a contact sensor. When the other object comes in contact with the robot, a signal is output from the contact sensor, thereby allowing detection of the contact of the other object with the robot.

The control apparatus 2 of the present embodiment includes the stop command unit 46 for stopping operation of the robot 1. The stop command unit 46 sends a signal for stopping the robot 1 to the operation control unit 43 when the robot becomes in a predetermined state. When the robot 1 is in operation, the operation control unit 43 stops the operation of the robot 1. During a stop period of the robot 1, the operation control unit 43 maintains the stop state of the robot 1.

When recognizing that the robot 1 is in contact with the other object, the worker operates the teaching operation panel 49 so that a portion of the robot 1 in contact with the other object retreats from the other object. In the control apparatus 2 of the present embodiment, a permissible range for an operation direction of the robot at a time when the robot 1 comes in contact with the other object is previously determined. In other words, a permissible range for a direction in which the robot retreats is previously determined.

Figure 3:
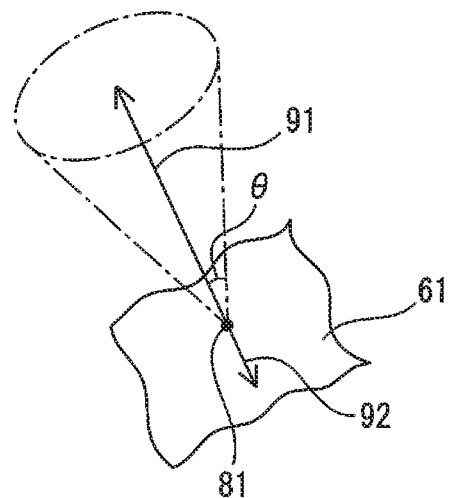
FIG. 3 is a diagram illustrating a permissible range for a direction of a retreat operation in the embodiment.

FIG. 3 shows a schematic diagram illustrating a permissible range for an operation direction of the robot. An example shown in FIG. 3 is a diagram in which a part of the workpiece W or the robot 1 is in contact with a surface of the other object 61. For example, the arm 12 of the robot 1 comes in contact with a contact point 81 of the other object 61. A direction of a force applied to the other object 61 is indicated by an arrow 92. A direction of an external force applied to the robot 1 is opposite to the direction of the force applied to the other object 61, as indicated by an arrow 91.

Referring to FIGS. 2 and 3, the contact detection unit 47 of the present embodiment is formed so as to be able to detect the point of application at which the external force is applied to the robot 1 and the direction in which the external force is applied. In the present embodiment, a direction which becomes a reference for retreat at the time of retreat of the robot 1 is referred to as a reference direction. In this example, the reference direction is set to the direction indicated by the arrow 91 in which the external force is applied from the other object 61. The contact detection unit 47 sets the reference direction based on the position of the contact point 81 and the direction in which the external force is applied. The worker operates the robot 1 so that the portion of the robot 1 in contact with the contact point 81 moves away from the other object 61.

The stop command unit 46 comprises an operation direction monitor unit 48 which monitors operation of the robot 1. An angle judgement value $\theta$ relating to operation direction of the robot 1 is previously determined. The angle judgement value $\theta$ is previously stored as the judgement value 55 in the judgement value storage unit 56. The operation direction monitor unit 48 sets directions within a range of the angle judgement value $\theta$ with respect to the reference direction to a permissible range. In this manner, the operation direction monitor unit 48 sets the permissible range for an operation direction of the robot based on the angle judgement value $\theta$ and the position of the contact point 81.

Additionally, the operation direction monitor unit 48 detects an operation direction of the robot 1 after the robot 1 comes in contact with the other object 61. The operation direction monitor unit 48 can detect the operation direction of the robot 1 based on the output of the state detector 16. The state detector 16 sends a state of the robot 1 at a time when performing a retreat operation to the operation direction monitor unit 48. For example, the operation direction monitor unit 48 can detect actual changes in the position and posture of the robot 1 by outputs of the rotation angle detector 15 and the like. Then, the operation direction monitor unit 48 can calculate the operation direction of the robot based on the changes in the position and posture of the robot 1.

The method for detecting a direction in which the robot 1 is actually operated is not limited to this form, and an arbitrary method can be employed. For example, the direction in which the robot 1 is actually operated may be detected based on a signal sent to the operation control unit 43 from the teaching operation panel 49. Alternatively, the direction in which the robot 1 is actually operated may be detected based on an operation command sent to the arm drive unit 44 from the operation control unit 43.

The operation direction monitor unit 48 permits operation of the robot when the robot 1 is operating within the permissible range. In other words, the stop command unit 46 does not send a command for stopping the robot 1 to the operation control unit 43. On the other hand, the operation direction monitor unit 48 inhibits operation of the robot 1 when an actual operation direction of the robot 1 falls outside the permissible range. In other words, the stop command unit 46 sends a command for stopping the robot 1 to the operation control unit 43. The operation control unit 43 stops driving of the robot 1 according to the stop command.

In this manner, when the robot 1 is in contact with an other object, the operation direction monitor unit 48 permits an operation in the direction appropriately away from the other object. On the other hand, the operation direction monitor unit 48 inhibits an operation away from the other object in an undesirable direction. Thus, the worker can operate with safety while avoiding operations of damaging the other object and giving damage to the robot. Alternatively, when the other object is a person, safety of the person can be ensured.

In addition, when the robot comes in contact with a person, the person often immediately steps away from the robot. In other words, the robot 1 is put into a state away from the person in a short time. The operation direction monitor unit 48 in the present embodiment monitors operation of the robot in a period during which the robot is in contact with the other object. On the other hand, the operation direction monitor unit 48 does not monitor operation of the robot 1 when there is no contact of the robot 1. Accordingly, immediately after the contact of the robot 1 is eliminated, the robot 1 can be freely operated.

Figure 4:
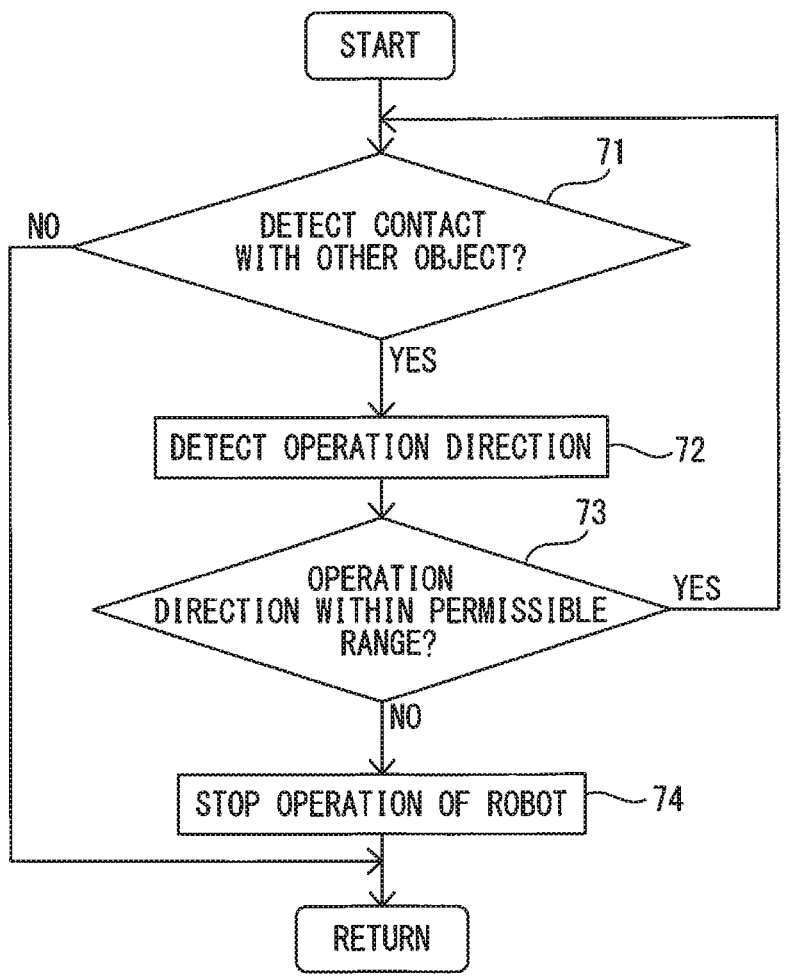
FIG. 4 is a flowchart of operation control in the embodiment.

FIG. 4 shows a flowchart of operation control in the present embodiment. The control depicted in FIG. 4 can be performed in a period during which the worker manually drives the robot by the teaching operation panel 49. Additionally, the control can be repeatedly performed at each predetermined time interval.

Referring to FIGS. 2 and 4, at step 71, the contact detection unit 47 judges whether or not the robot 1 is in contact with the other object. When the robot 1 is not in contact with any other object, the control is ended. When the robot 1 is in contact with the other object, the routine proceeds to step 72.

At step 72, the operation direction monitor unit 48 detects an actual operation direction of the robot 1. Next, at step 73, the operation direction monitor unit 48 judges whether or not the detected operation direction is within the permissible range. When the operation direction of the robot 1 is within the permissible range, a return to step 71 is made and monitoring of the operation of the robot 1 is repeated. At step 73, when the operation direction of the robot 1 is outside the permissible range, the routine proceeds to step 74.

At step 74, the operation of the robot 1 is stopped. The stop command unit 46 sends a command for stopping the operation of the robot 1 to the operation control unit 43.

By adopting this control, monitoring of the operation direction of the robot 1 can be performed in the period during which the robot 1 is in contact with the other object, and the monitoring can be ended simultaneously with the time when the robot 1 moves away from the other object. In addition, although the monitoring of the operation direction of the robot is started simultaneously with the detection of the contact thereof with the other object in the above embodiment, the embodiment is not limited to this. Monitoring of the operation direction of the robot may be started at a time when the robot is stopped for the first time after detecting the contact with the other object.

As described above, in the control of the present embodiment, the reference direction for moving the robot 1 or the workpiece W away from the other object at the time of contact with the other object is set. In the above-described control apparatus, since the point of application of an external force and the direction of the external force can be detected, the direction in which the external force is applied to the robot is set as the reference direction. The method for setting the reference direction is not limited to this form, and an arbitrary direction in which the other object moves away from the robot can be employed.

For example, when the robot is covered with a covering member having a contact sensor, the point of application at which the external force is applied to the robot can be detected. However, the direction in which the external force is applied to the robot is not detected. Due to this, among normal directions at the point of application on a surface of the covering member, the direction away from the other object can be set as the reference direction. In other words, a direction perpendicular to the surface of the covering member can be set as the reference direction, as an appropriate direction in which the robot is operated.

Alternatively, the trajectory of the robot can be stored in the storage unit while the robot is being manually driven. For example, the storage unit can store a position and a posture of the robot at each predetermined time interval. When the robot comes in contact with the other object, a direction for moving in an opposite direction along the stored trajectory can be set as a reference direction. In this case, the reference direction may be a curve. Then, a range of a predetermined distance with respect to the stored trajectory can be set as a permissible range.

For example, the force detector can be arranged at the base unit 11 of the robot 1. When the force detector is arranged at the base unit 11 of the robot, the direction of an external force applied to the robot 1 can be detected, but the point of application of the external force applied to the robot 1 cannot be detected. Even in such a case, a direction for retreating along the stored trajectory can be employed as the reference direction. This method is effective when the other object is in a stopped state or the other object moves more slowly than the robot.

Alternatively, when the robot 1 comes in contact with the other object, an immediately preceding movement point in the stored trajectory is detected. Then, a direction orienting from a position at the time of the contact to a position immediately before the contact can be set as the reference direction. Thus, when the position and posture of the robot are controlled at each predetermined time interval, the direction orienting from the position at the time of the contact to the position immediately before the contact can be set as the reference direction. Then, a permissible range within which the robot moves away can be set based on the reference direction.

In the above example, the case of manually operating the robot by the teaching operation panel 49 is described. The method for manually operating the robot is not limited to this form, and an arbitrary method can be employed. For example, a handle (a hand guide) which can be operated by the worker is arranged at a tip of the robot. Then, the robot system can comprise a direct teaching device in which the worker operates the handle and which stores teaching points. In the direct teaching device, the worker can directly teach operation of the robot.

Next, a description will be given of control in automatic operation of the robot. Referring to FIG. 2, the control apparatus 2 in the present embodiment is formed so as to be able to drive the robot based on the operation program 41. The operation program 41 may include, for example, a command for retreating from a contact point when the robot comes in contact with the other object in a period during which the robot is automatically driven. The operation direction monitor unit 48 of the present embodiment can monitor whether operation of the robot 1 is normal or not even in a period during which retreat operation is performed based on the operation program. Then, when the retreat direction of the robot 1 exceeds the permissible range, the stop command unit 46 can stop the robot 1.

Figure 5:
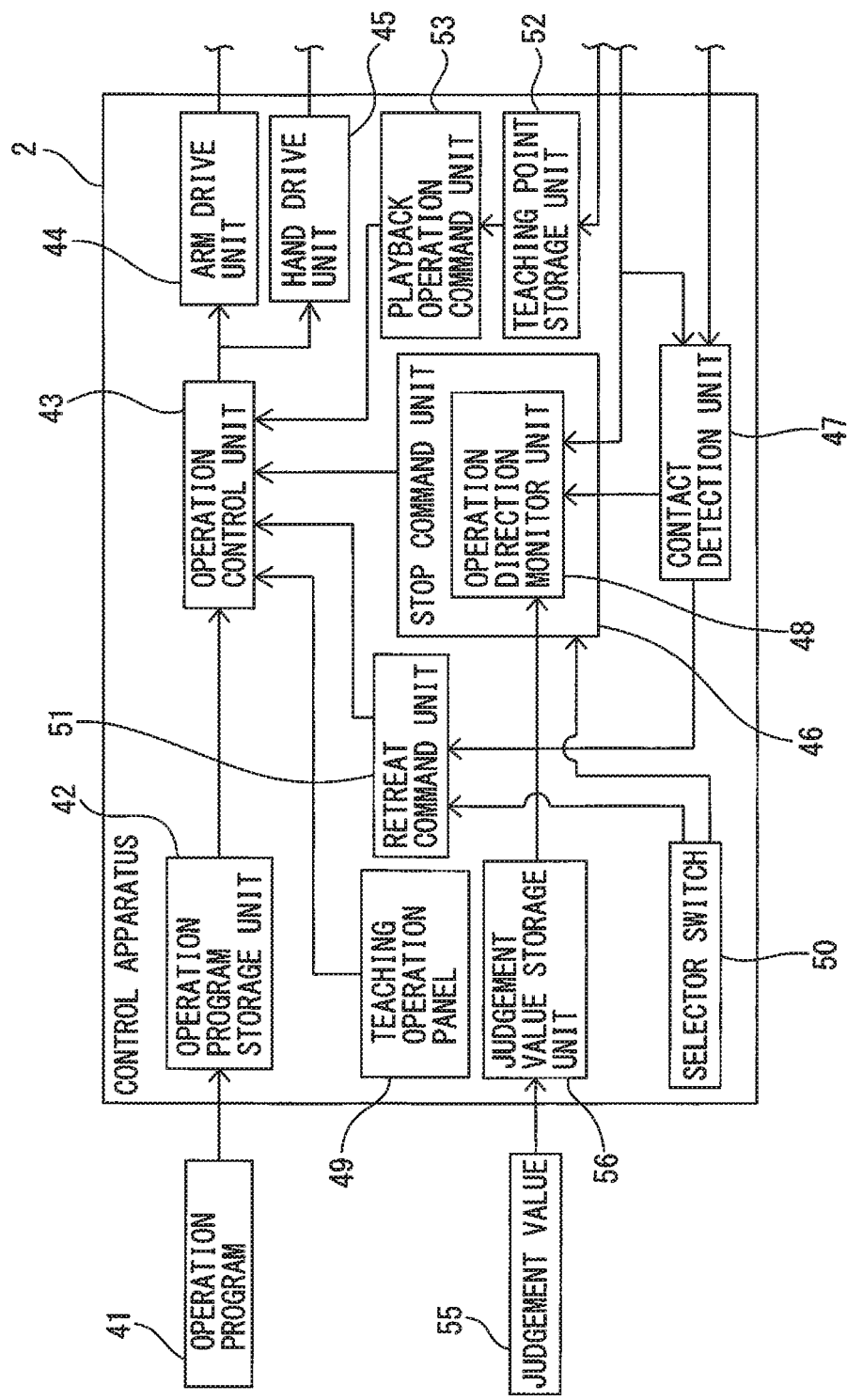
FIG. 5 is a block diagram of a second robot system in an embodiment.

FIG. 5 shows a block diagram of a second robot system in a present embodiment. A part of a control apparatus 2 is described in FIG. 5. The configuration of the robot is the same as that of the first robot system (see FIG. 2). The control apparatus 2 of the second robot system is formed so as to be able to switch between a teaching mode in which an operation of the robot is taught by manually operating the robot and a playback mode in which the robot 1 automatically reproduces the taught operation. The control apparatus 2 includes a selector switch 50 for switching between the teaching mode and the playback mode.

When the worker selects the teaching mode at the selector switch 50, the robot 1 is operated by the teaching operation panel 49 in order to teach teaching points to the robot 1. The teaching point storage unit 52 stores the teaching points set by the worker. On the contrary to this, when the worker selects the playback mode at the selector switch 50, the playback operation command unit 53 produces a trajectory based on the teaching points stored in the teaching point storage unit 52. The playback operation command unit 53 sends a command for operating the robot 1 along the produced trajectory to the operation control unit 43.

The control apparatus 2 includes a retreat command unit 51 which automatically operates the robot 1 in a direction away from the other object at a time when the robot 1 comes in contact with the other object. As the operation direction of the robot 1 commanded by the retreat command unit 51, the direction in which the robot 1 moves away from the other object can be employed, as described above. When the contact between the robot 1 and the other object is detected, the retreat command unit 51 can send a command for performing a retreat operation of the robot 1 to the operation control unit 43.

When the playback mode is selected by the selector switch 50, control by the stop command unit 46 is stopped and control by the retreat command unit 51 is performed. On the other hand, when the teaching mode is selected by the selector switch 50, control by the retreat command unit 51 is stopped and control by the stop command unit 46 is performed.

As described above, the selector switch 50 is provided so as to switch the operation of the robot at a time when the robot comes in contact with the other object. In the playback mode, when the robot comes in contact with the other object, the robot automatically moves in a direction away from the other object. Accordingly, damaging the other object can be suppressed. Additionally, in the teaching mode, when the robot comes in contact with the other object, the operation direction monitor unit monitors the operation direction of the robot. Thus, even when the worker performs an erroneous operation, damage to the other object can be suppressed. Then, when the robot is brought into a state of being not in contact with the other object, the robot can be freely operated.

The robot control apparatuses of the present embodiments are suitable for robot systems provided with a collaborative robot in which a person and the robot collaboratively work. For example, it is suitable for a robot system in which a robot and a worker perform single work. Alternatively, it is suitable for a robot system in which no safety fence is provided between a worker and a robot in a state where the robot and the worker perform work different to each other.

While the present embodiments have been described by exemplifying the multi-joint robot, the invention is not limited to the embodiments. The invention can be applied to any robot control apparatus which controls an arbitrary robot.

The robot control apparatus of the present invention can perform an operation of safely eliminating contact when the robot comes in contact with a person or an object.

In each control described above, the order of the steps can be changed as appropriate in a range not changing functions and effects of the invention. The embodiments described above can be combined as appropriate. In each drawing described above, the same or equal parts are denoted by the same signs. The embodiments described above are exemplary and do not limit the invention. Additionally, the embodiments include changes of the embodiments described in the claims.

The invention claimed is:

1. A robot control apparatus, comprising:
   a contact detection unit which judges whether or not a robot is in contact with an object other than the robot; and
   an operation direction monitor unit which detects an operation direction of the robot after the robot comes in contact with the object, and monitors operation of the robot; wherein
   the contact detection unit set a reference direction which is a direction of reference for retreat of the robot when the robot comes in contact with the object,
   the reference direction is a direction in which the robot moves away from the object,
   the operation direction monitor unit sets a range within a predetermined angle with respect to the reference direction to a permissible range, and
   after the robot comes in contact with the object, the operation direction monitor unit permits operation of the robot being within the permissible range and inhibits operation of the robot falling outside the permissible range.

2. The robot control apparatus according to claim 1, further comprising:
   a selector switch which switches between a teaching mode in which a worker manually operates the robot so as to teach an operation of the robot and a playback mode in which the robot automatically reproduces the taught operation; and
   a retreat command unit which automatically operates the robot in a direction away from the object when the robot comes in contact with the object; wherein when the playback mode is selected by the selector switch, the robot is operated by the retreat command unit when the robot comes in contact with the object; and
   when the teaching mode is selected by the selector switch, the operation of the robot is monitored by the operation direction monitor unit when the robot comes in contact with the object.

3. The robot control apparatus according to claim 1, wherein the operation direction monitor unit stops the robot when the operation direction of the robot falls outside the permissible range.

* * * * *